Sept. 3, 1935.  L. H. BOSNIAN  2,012,947

CHAIN PINTLE

Filed June 17, 1933

Inventor
Luther H. Bosnian
By Barker & Collings
Attorneys

Patented Sept. 3, 1935

2,012,947

UNITED STATES PATENT OFFICE 2,012,947

CHAIN PINTLE

Luther H. Bosnian, Milwaukee, Wis., assignor to Chain Belt Company, Milwaukee, Wis., a corporation of Wisconsin Application June 17, 1933, Serial No. 676,389

8 Claims. (Cl. 74—254)

This invention relates to power transmitting and conveyor sprocket chains of the pintle-connected type, and has for one of its objects to improve the construction of the chain pintles whereby the assembly of the individual links into a complete chain may be greatly facilitated.

One well known form of sprocket chain specially designed for and widely used in high speed oil field work, is made up of fabricated links each of which comprises a pair of spaced steel side bars rigidly connected together at one end by a transverse thimble or hollow bushing, the ends of which are firmly pressed into apertures in the side bars to provide substantially U-shaped rigid links. The opposite ends of the side bars are spread apart somewhat so that they may embrace the closed end of the next adjacent link, and are apertured for the reception of the connecting pin or pintle, which also passes through the hollow bushing to connect the two links together. Owing to the high speeds at which these chains operate, it is desirable that such of the assembled parts as do not move relative to one another be as rigidly connected as is feasible, and to this end the pintles are ordinarily press-fitted into the apertures in the free ends of the side bars, although the mid-portions of the pins of course have a running fit with the interior of the bushings of the adjacent links in order that the links may articulate. At least one of the apertures in the free ends of the side bars, and the corresponding portion of the pintle, are provided with one or more complementary flats which further prevent the pins from turning in the apertures. The pintles may be headed at one end, and locking cotters are passed through the projecting unheaded ends, immediately adjacent the side bar, and are forced into place under heavy pressure, thus insuring against unintentional displacement of the pintles, even should they become loose in the side bars.

Heretofore, the pins have been of uniform diameter throughout their length, except for a short portion immediately adjacent the head which was slightly larger in diameter in order that it might have a press fit with the side bar aperture, whereas the main body portion of the pin would freely slide therethrough. The aperture in the opposite side bar, which was ordinarily provided with the flats above mentioned, was of such diameter that the unheaded end of the pin would have a press fit therein.

In assembling these chains, considerable difficulty has been experienced in properly locating the flats on the pins relative to those in the apertures, and the primary object of the present invention is to provide a pin construction which to a large extent eliminates this difficulty.

With the above and other objects in view, which will appear as the description proceeds, the invention consists in the novel details of construction and combinations of parts more fully hereinafter described and particularly pointed out in the appended claims.

Referring to the accompanying drawing forming a part of this specification, in which like reference characters designate like parts in all the views:—

Figure 1:
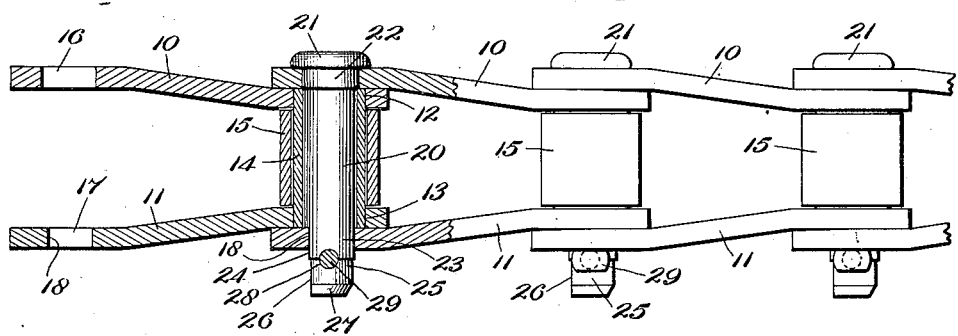
Figure 1 is a plan view, partly in section, of a length of high speed sprocket chain such as above described, employing chain pins constructed in accordance with the present invention.
Figure 2:
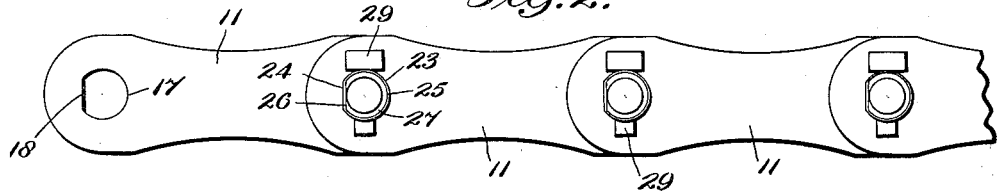
Figure 2 is a side elevational view of the parts shown in Fig. 1.

Referring more particularly to the said drawing, in Figs. 1 and 2 there are illustrated several links of a well known form of high speed sprocket chain, each of which comprises the side bars 10 and 11, provided at one end with apertures 12 and 13 respectively, into which are pressed the ends of a tubular bushing 14, thus providing a rigid substantially U-shaped link. An antifriction roller 15 may be journalled upon the bushing 14, to take the wear from the sprocket teeth.

The opposite ends of the bars 10 and 11 are spread apart somewhat, so that they may embrace the narrow end of the next adjacent link, as will be readily understood from the drawing, and said ends are provided respectively with the apertures 16 and 17, the former of which is preferably of somewhat larger diameter than the latter. The aperture 17 is provided with one or more flats 18, or other equivalent means, for cooperation with a companion means on the chain pintle to prevent the pintle from turning in the link, in addition to the resistance to turning resulting from the press fit of portions of the pintle in the apertures 16 and 17.

The pintle 19 comprises a body 20 provided at one end with a head 21, immediately adjacent which there is a portion 22 of somewhat larger diameter than the main body 20, which portion 22 is adapted to be forcibly pressed into the aperture 16 of the side bar 10. The body 20 is of such diameter as to provide a running fit within the tubular bushing 14, whereby the links may articulate, and the aperture 17 in the side bar 11 is of such diameter as to be a press fit upon the end portion 23 of body 20, which end portion is provided with one or more flats 24 arranged to cooperate with the flat or flats 18 in aperture 17, as above mentioned.

Beyond the press fit portion 23, the diameter of the body is somewhat reduced, as at 25, which reduced portion is provided with a flat 26 in alinement with the flat 24, as clearly shown in the drawing. The extreme end of the reduced portion 25 is preferably beveled, as at 27, and that portion of the body which projects beyond the side bar 11 when the parts are assembled, is provided with a transverse bore 28 for the reception of a cotter pin 29, which is preferably forced into place under heavy pressure.

Heretofore, the pins 19 have not been provided with the reduced portion 25, which, while in actual practice is only approximately 0.015″ less in diameter than the body 20 and press fit portion 23, permits the said portion to freely enter the aperture 17 during assembly, if the flats 18, 24 and 26 are in alinement. In assembling with the prior pins, after the apertures 16 and 17 of one link had been brought into alinement with the bore of bushing 14 of the next link, when the pin was inserted therein, its unheaded end being of press fit dimension relative to the aperture 17, contacted the upper edge of the said aperture, and it was extremely difficult for the workman to determine by sense of touch whether the flats, such as 18 and 24 were in alinement or not. Likewise, the penetration of the pin was substantially the same when the flats were in alinement as when they were not, so that the length of the portion of the pin still projecting could not be relied upon to indicate whether the flats were in alinement. As a result, many pins were bent and lost through attempting to press them home when the flats were out of alinement.

Figure 4:
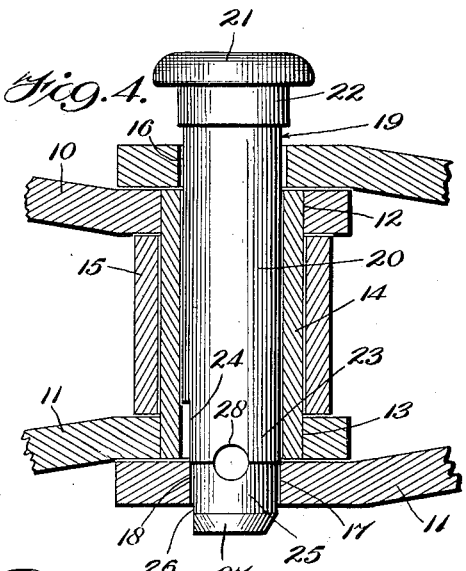
Figure 5:
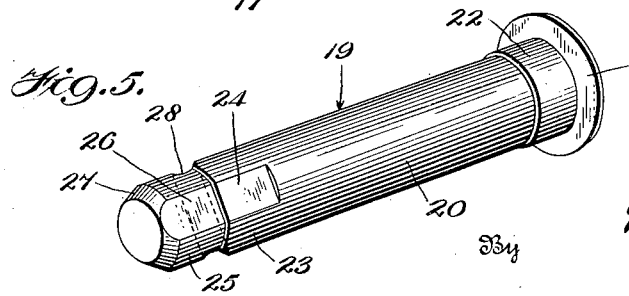
Figure 5 is a perspective view of the pin itself.

When the present pin is inserted in the alined link apertures however, if the flats 18, 24, and 26 are in alinement, the pin immediately moves to the position illustrated in Fig. 4, and the workman can tell at a glance by the position of the head 21 and enlargement 22 relative to the side bar 10 that the pin is in proper position to be pressed home. He can also check this by attempting to rotate the pin manually, which rotation will of course be prevented due to the interlocking of the flats 18 and 26.

Figure 3:
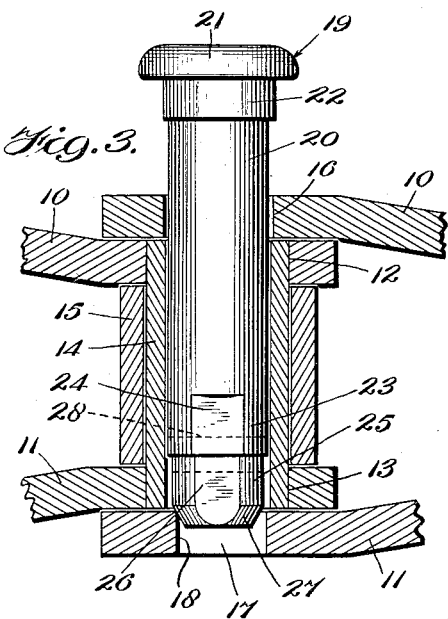
Figures 3 and 4 are enlarged fragmentary sectional views, illustrating the manner in which the present pin construction facilitates the proper positioning of the flats relative to one another in the assembly of the pins and links.

On the other hand, if the flats 18, 24 and 26 are not properly alined when the pin is entered, it will move inwardly only to the position shown in Fig. 3, and the workman can tell at a glance from the greater distance between the head 21 and side bar 10 that the pin is not ready to be pressed home. Manual rotation of the pin is also possible, since the flats 18 and 26 are not interengaged, and such rotation should be continued until they do engage, whereupon the pin will freely move to the position shown in Fig. 4, and the operative knows positively that it is in proper position to have its press fit portions 22 and 23 forced into the apertures 16 and 17 of the side bar.

The invention thus facilitates the positioning of the pins so that the flats 18 and 24 are in proper alinement relative to one another before the press fit portions of the assembly contact with one another, and reliably indicates both visually and by sense of touch when the pins are or are not properly positioned.

It is obvious that those skilled in the art may vary the details of construction as well as the precise arrangement of parts without departing from the spirit of the invention and therefore, it is not wished to be limited to the above disclosure except as may be required by the claims.

What is claimed is:

1. A pin for power transmitting sprocket chains and the like, having a body provided with means arranged to cooperate with a complementary portion of a link to prevent turning of the pin in the link, said body also having a reduced cylindrical extension provided with means in alinement with and similar to said first named means and parallel to the pin axis, for facilitating the proper positioning of said complementary means and portion during assembly.

2. A pin for power transmitting sprocket chains and the like, having a body provided with means arranged to co-operate with a companion portion of a link to prevent turning of the pin in the link, said body also having a reduced cylindrical extension provided with a flattened portion parallel to the pin axis and in alinement with said rotation preventing means, for facilitating the proper positioning of said companion means and portion during assembly.

3. A pin for power transmitting sprocket chains and the like, having a cylindrical body provided with a flattened portion arranged to co-operate with a companion portion of a link to prevent turning of the pin in the link, said body also having a reduced cylindrical extension provided with a flattened portion in alinement with said first mentioned flat and parallel to the pin axis, for facilitating the proper positioning of said first flattened portion and the companion portion of the link during assembly.

4. A pin for power transmitting sprocket chains and the like, having a body provided with portions arranged to be forcibly pressed into apertures in a link, at least one of said portions having a flat adapted to co-operate with a companion flat in its aperture to prevent turning of the pin in the link, said body also having a reduced cylindrical portion adapted to freely pass through said aperture, and provided with a flat in alinement with said first named flat and parallel to the pin axis, for facilitating during assembly the proper positioning of said companion flats relative to one another prior to engagement of said press fit portions with the apertures into which they are to be forced.

5. A pin for power transmitting sprocket chains and the like, having a body headed at one end and provided with portions arranged to be forcibly pressed into apertures in a link, one of said portions having means arranged to co-operate with a companion means on the link to prevent turning of the pin in the link, the unheaded cylindrical end of said body beyond one of said press-fit portions being of somewhat reduced diameter to freely pass through its aperture, and provided with means parallel to the pin axis and in alinement with its rotation preventing means, for facilitating during assembly the proper positioning of said co-operating companion means relative to one another prior to engagement of said press fit portions with the apertures into which they are to be forced.

6. A pin for power transmitting sprocket chains and the like, having a cylindrical body provided with spaced portions arranged to be forcibly pressed into apertures of the side bars of a link, one of said portions having a flat arranged to co-operate with a companion flat in its aperture to prevent turning of the pin in the link, said body also having a reduced cylindrical portion adjacent said press fit portion adapted to freely pass through said side bar aperture, said reduced cylindrical portion also having a flat in alinement with said first named flat and parallel to the axis of the pin, for facilitating during assembly the proper positioning of said companion flats relative to one another prior to engagement of said press fit portions with the apertures into which they are to be forced.

7. A pin for power transmitting sprocket chains and the like, comprising a cylindrical body provided at one end with a circular head, and an enlarged press fit portion adjacent said head adapted to be forcibly pressed into an aperture in one of the link side bars, the other end of said body being adapted to be forcibly press-fitted into an aperture in the other side bar, and having means arranged to co-operate with a portion of said aperture to prevent turning of the pin, said body also having a reduced cylindrical extension beyond said last named press fit portion, adapted to freely pass through said aperture and project beyond said side bar, said extension having means parallel to the pin axis and in alinement with said pin carried rotation preventing means, arranged to facilitate during assembly the proper alinement of the rotation preventing means of said last named press fit portion and aperture.

8. The combination with a chain link having spaced side bars, one of which is provided with a pin-receiving aperture having a flat, of a pin including a body having a portion provided with a companion flat arranged to be forcibly fitted into said side bar aperture, said flats preventing rotation of the pin; said body also having a reduced cylindrical extension beyond said force-fit portion, also provided with a flat in alinement with the flat of said force-fit portion, and parallel with the pin axis, said extension being adapted to freely pass through said aperture when said pin and aperture flats are alined, and when mis-alined to engage with an edge of the aperture flat, thereby maintaining the pin in a projecting position which indicates such mis-alinement.

LUTHER H. BOSNIAN.